Nov. 18, 1952        H. C. SILENT        2,618,209
FOLLOW-FOCUS SYSTEM FOR CAMERAS AND THE LIKE
Filed Jan. 30, 1948        5 Sheets-Sheet 2
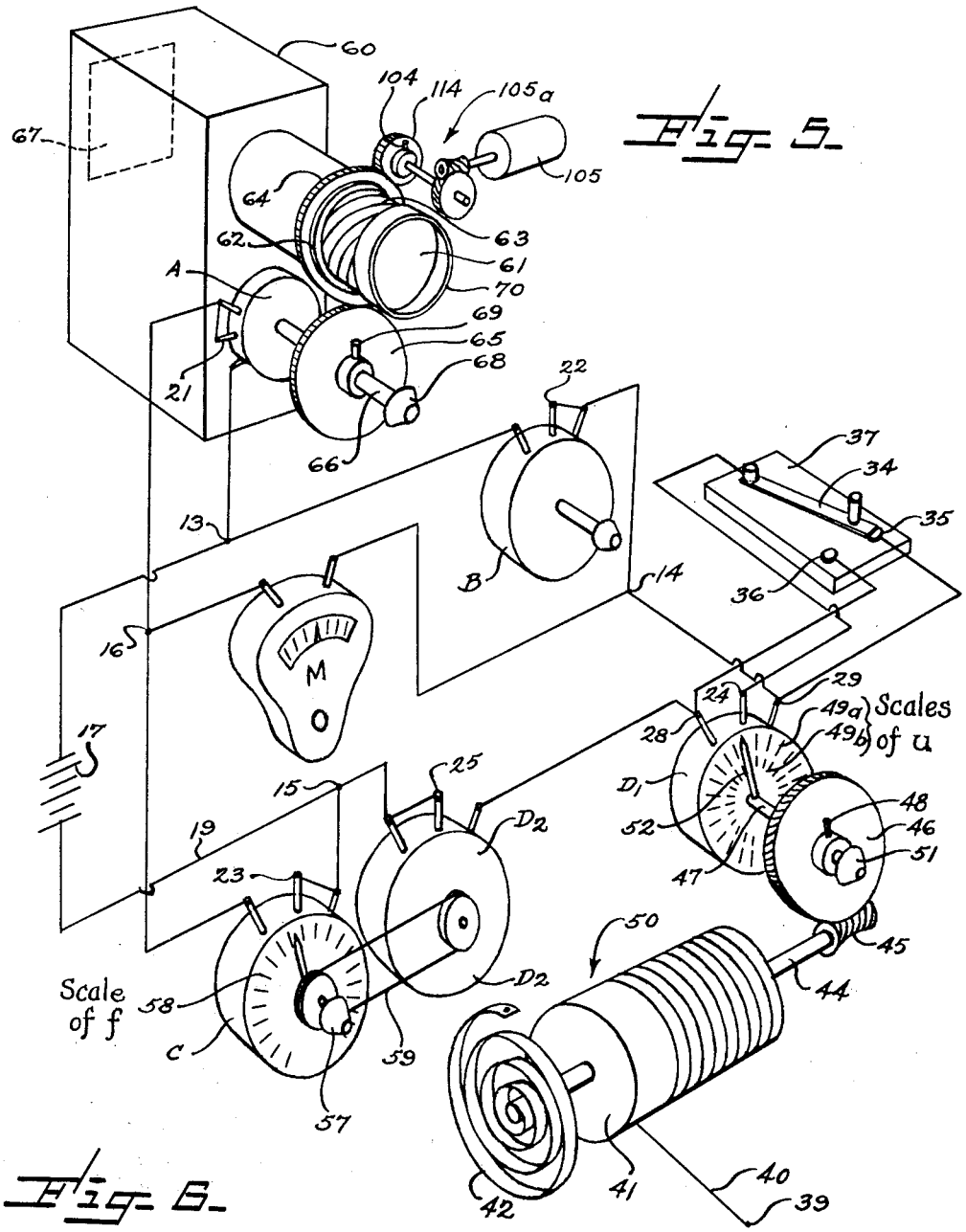
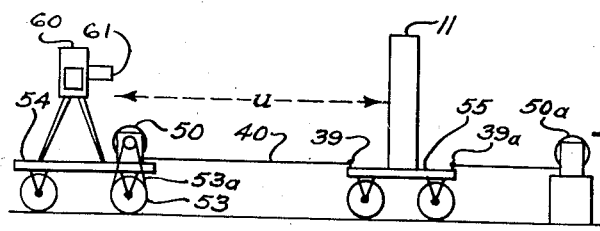
Inventor
Harold C. Silent
Bakelew & Scawklebery
Attys.

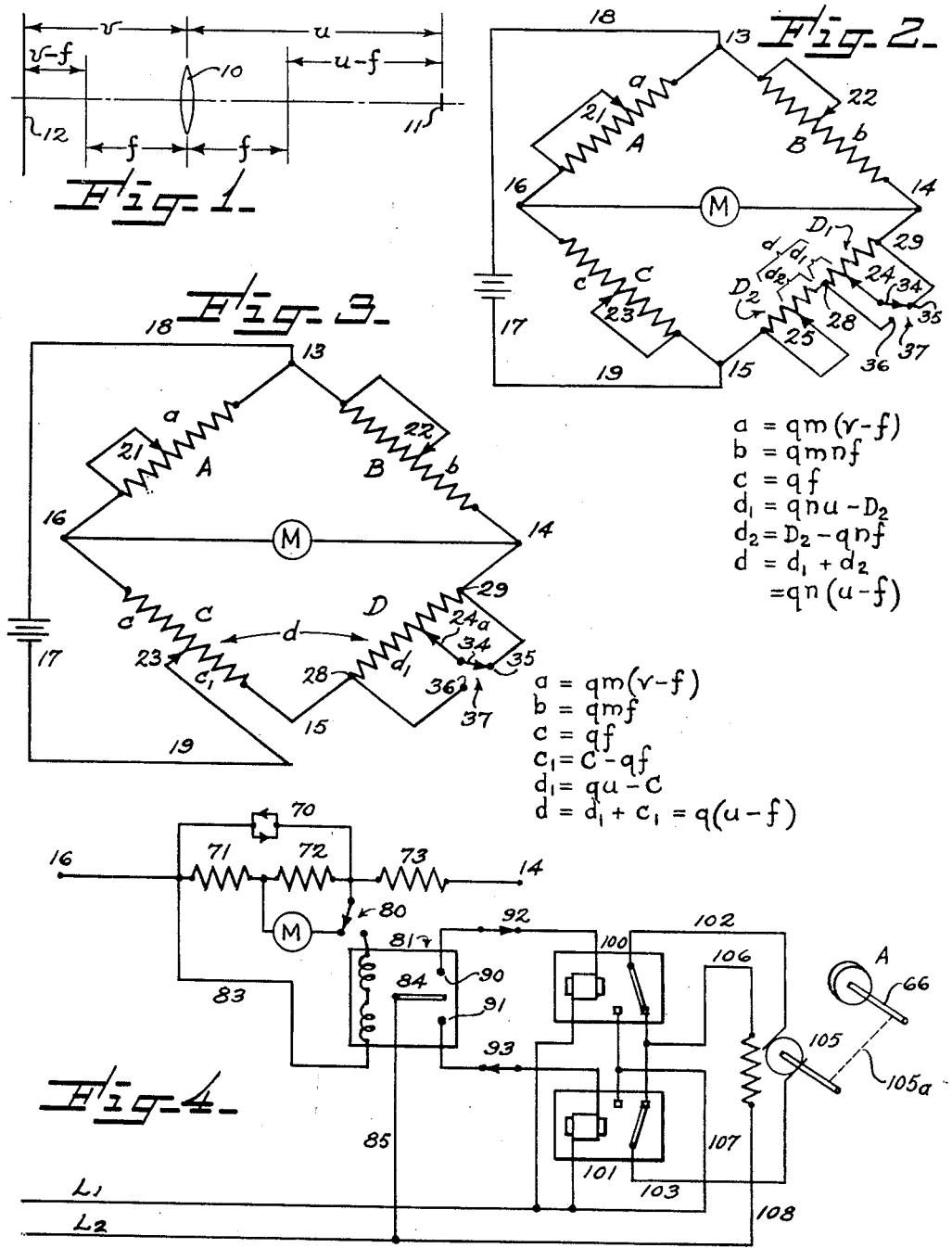

Nov. 18, 1952        H. C. SILENT        2,618,209

FOLLOW-FOCUS SYSTEM FOR CAMERAS AND THE LIKE

Filed Jan. 30, 1948        5 Sheets-Sheet 3

Inventor
Harold C. Silent
Berkelew & Scantlebury
Attys.

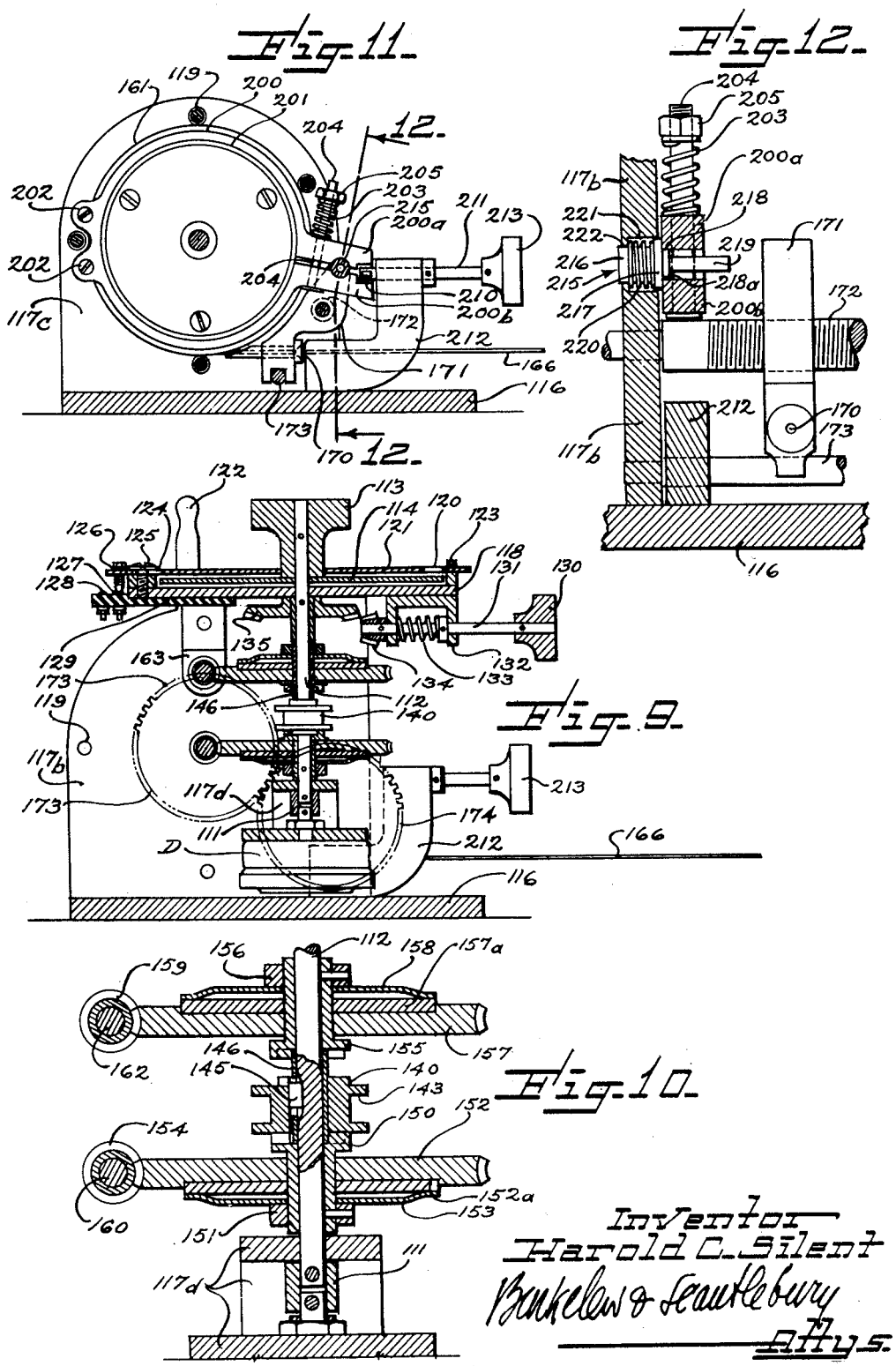

Nov. 18, 1952          H. C. SILENT          2,618,209
FOLLOW-FOCUS SYSTEM FOR CAMERAS AND THE LIKE
Filed Jan. 30, 1948          5 Sheets-Sheet 5
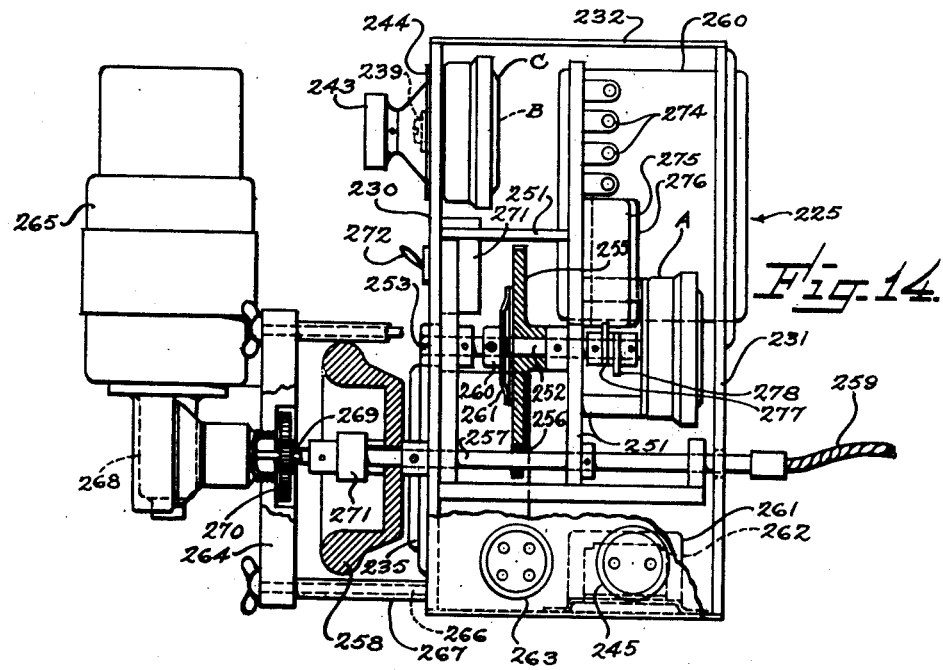
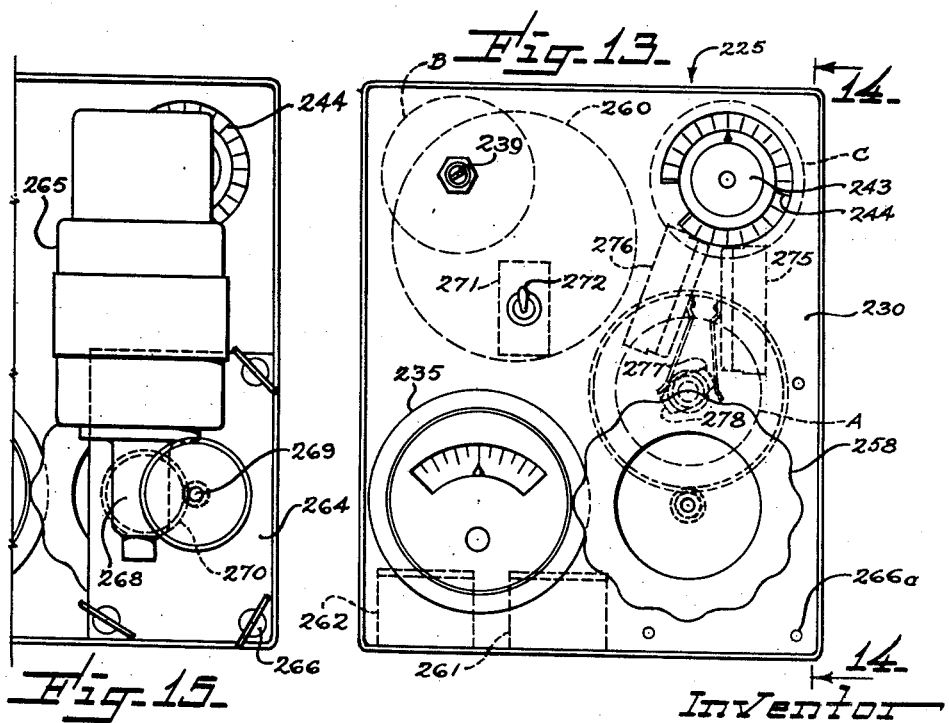

Patented Nov. 18, 1952

2,618,209

UNITED STATES PATENT OFFICE 2,618,209

FOLLOW-FOCUS SYSTEM FOR CAMERAS AND THE LIKE

Harold C. Silent, Los Angeles, Calif., assignor to Mitchell Camera Corporation, Glendale, Calif., a corporation of Delaware Application January 30, 1948, Serial No. 5,257

6 Claims. (Cl. 95—45)

This invention has to do generally with electrical means for focusing a lens, and more particularly with automatic or semi-automatic means for continuously maintaining a lens in correct focal adjustment as the object distance is varied. An important general purpose of my invention is to produce such a follow-focus system as does not require any non-linear mechanical motions involving specially cut cams or the like, and which is readily adjustable for lenses of different focal lengths or for lens mounts with focusing screws of different pitches.

The invention is well adapted to the focusing of many different types of image-forming devices, including in particular optical elements such as lenses or mirrors, the latter being here considered to be a form of lens. The invention is particularly suitable for maintaining a motion picture camera, television camera, or the like in correct focus while the distance from the camera to the object being photographed is varied in an arbitrary way. Without implying any limitation of the invention, it will be described with relation to this particular application.

As will be seen more clearly from the detailed description below, according to a preferred form of the invention a number of variable impedances, such for example as electrical resistances, are so arranged that they may be made to vary (manually or automatically) in linear relation to physical quantities, or to linear combinations of physical quantities, upon which correct focus of the camera lens depends. The resistances are connected in an electrical bridge network by which their values can be compared, the connections being such that (after necessary preliminary settings have been made) correct focus of the camera lens is accompanied by a condition of balance of the electrical bridge. Such a condition can be indicated, for example, by a suitable meter in the bridge circuit. Correct focus is then maintained during arbitrary variation of the object distance by manipulation of the focus adjustment in such a way as to maintain the bridge in balance. This manipulation may be manual or automatic; in either case correct focus can be maintained continuously.

A particular object of the invention is to provide a device of the general type described which is capable of operating with high accuracy not only when the image distance and the object distance are comparable, but also when they differ by a large factor. In addition, the invention permits rapid and convenient adjustment for various conditions of use, and facilitates the direct checking or re-calibration of the focal adjustment by standard methods wherever desired.

A clear understanding of the invention will be obtained from the following description of the considerations upon which it is based, and of the details of certain illustrative preferred embodiments, which are not to be interpreted as limiting the scope of the more fundamental characteristics of the invention. This description is to be read in conjunction with the attached drawings, of which:

Fig. 1 is a schematic drawing illustrating the relationship of various optical quantities;

Fig. 2 is a schematic wiring diagram illustrating one form of electrical circuitry in accordance with the invention;

Fig. 3 is a schematic diagram of a preferred arrangement of circuitry, in simplified form;

Fig. 4 is a fragmentary schematic diagram illustrating auxiliary circuitry suitable for use in conjunction with either Fig. 2 or Fig. 3;

Fig. 5 is a schematic perspective of an embodiment of the invention, incorporating the type of circuit shown in Fig. 2;

Fig. 6 is a schematic elevation illustrating the application of the invention to the problem of focusing a motion picture camera;

Figure 7:
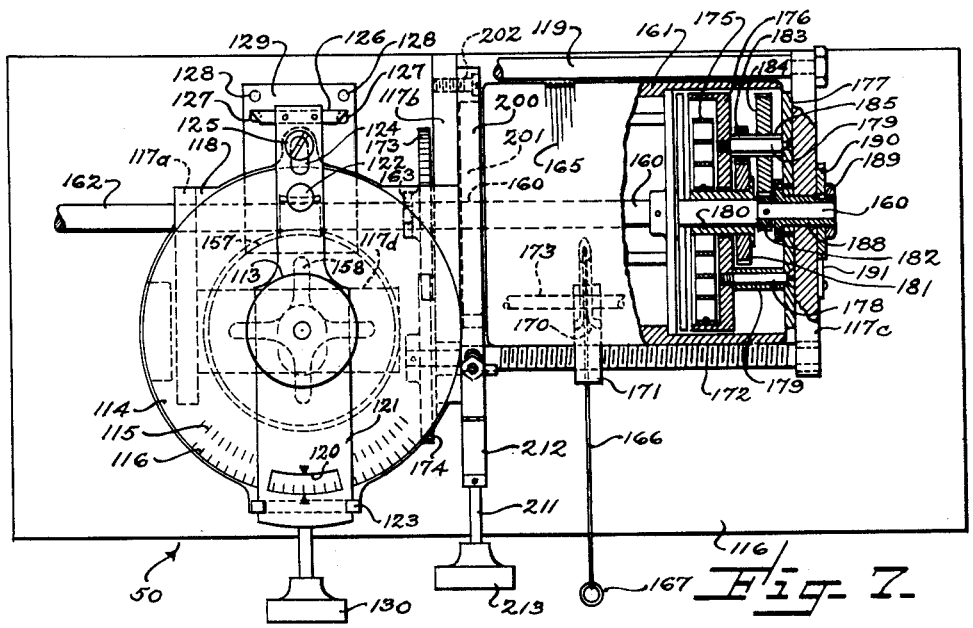
Figure 8:
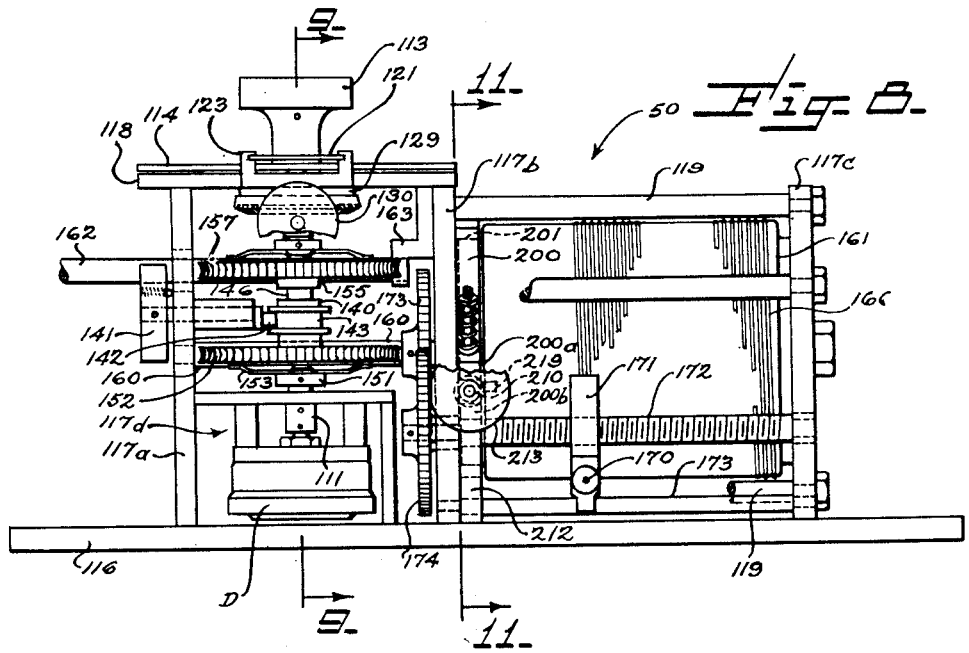

Figs. 7 through 12 illustrate a preferred embodiment of apparatus for varying a resistance in accordance with the lens to object distance; Fig. 7 being a partially cut away plan view of this apparatus; Fig. 8 an elevation; Fig. 9 a section taken on line 9—9 of Fig. 8; Fig. 10 a fragmentary section showing the central portion of Fig. 9 at enlarged scale; Fig. 11 a section taken on line 11—11 of Fig. 8; and Fig. 12 an enlarged fragmentary section taken on line 12—12 of Fig. 11;

Figs. 13 through 15 illustrate a preferred embodiment of a control unit for use in conjunction with the apparatus of Figs. 7-12; Fig. 13 being a front elevation of the control unit with focus drive motor removed; Fig. 14 a partially cut away side elevation in the aspect indicated by line 14—14 in Fig. 13, and showing the motor in position; and Fig. 15 a fragmentary front elevation showing the motor in position.

The present invention makes use of the well-known formula expressing the relation between conjugate focal distances $u$ and $v$ of a lens whose focal length is $f$. This formula may be written in the form $$\frac{v-f}{f} = \frac{f}{u-f} \qquad (1)$$

It is broadly immaterial which of the quantities $u$ and $v$ denotes the object distance and which the image distance; or which of those distances is varied to focus the lens. For clarity of discussion a definite notation is adopted in the present description, but without intending any limitation of the scope of the invention. In the typical problem of focusing a camera lens, the object distance or outer focal distance $u$, which is the distance from the camera lens 10 to the object 11 which is to be photographed (Fig. 1), generally varies in a more or less arbitrary way, and it is required to adjust the inner focal distance or image distance $v$, which is the distance from the lens 10 to the film 12 or other image receiving surface, in such a way that Equation 1 is satisfied. The image distance $v$ appears in Equation 1 (written in the present form) only in the expression $v-f$, which is equal to the distance by which the lens is displaced from its infinity focus position, i. e., from its correct focal position for an object at infinity ($u=\infty$). This is an important point for the present purpose, since the means generally provided on a camera for focusing the lens are well adapted for moving the lens accurately relative to its infinity focus position. Unless the object to be photographed is unusually close to the camera the quantity $v-f$ is small compared to the image distance $v$ itself, varying typically from zero for an infinitely distant object to about one fifth of the focal length $f$ for a normal "close-up."

Since a camera is normally focused by axial motion of its lens, rather than of its image receiving surface, the quantity $v-f$ is here referred to as the lens displacement from its infinity focus position. However, the invention is also applicable to mechanisms having other types of focal adjustment, such as movable mirrors or movable film holders. Modifications in the following description to include such mechanisms will be obvious to those skilled in the art.

As seen immediately in Fig. 1, the quantity $v-f$ may be described either as the displacement of the lens from its infinity focus position, or as the distance between the inner focal plane 12 and the inner pricipal focus of the lens. And the quantity $u-f$ may be referred to either as the outer focal distance $u$ minus the focal length of the lens, or as the distance between the object 11 and the outer principal focus of the lens. In passing, it may be noted that while I speak of the inner and outer focal distances $v$ and $u$ simply as distances from the lens, they are more accurately defined, as is well known, as the distances from the inner and outer principal planes of the lens.

A difficulty usually encountered in setting the image distance $v$ (or the lens displacement $v-f$) in accordance with Equation 1 is the fact that the equation is not linear. According to the present invention, this difficulty is overcome by means of an electrical circuit, which in effect solves the non-linear optical equation. The circuit contains electrical elements which correspond to various optical quantities appearing in the equation. Only linear relations are required between the various individual electrical elements which comprise the circuitry and the corresponding optical quantities. Thus it is possible to provide relatively simple mechanical or other linkages which will maintain the correct linear correspondence between the electrical and optical quantities. All non-linear characteristics of Equation 1 are taken care of automatically by the inherent properties of the electrical circuit.

An example of a suitable type of circuit for this purpose is the well-known Wheatstone's bridge circuit, comprising four electrical impedances, which are typically but not necessarily resistances. Fig. 2 shows a typical manner of connection of the four resistances, $a$, $b$, $c$ and $d$, in the four arms of the bridge circuit. Resistances $a$, $b$ and $c$ are the effective resistances respectively of rheostats or potentiometers A, B and C with variable contacts 21, 22 and 23. Resistance $d$, in the modification of Fig. 2, is made up of two portions $d_1$ and $d_2$, the effective resistances of rheostats $D_1$ and $D_2$, which are connected in series and have the separately adjustable variable contacts 24 and 25. Alternatively, a single rheostat with two adjustable contacts connected to opposite ends of the winding can be used in place of $D_1$ and $D_2$. A battery or other source of direct or alternating voltage is represented at 17, connected by lines 18, 19 to the opposite points 13, 15 respectively of the bridge network. A voltage sensitive device of any suitable type, such as the meter indicated at M, is connected between the network points 14 and 16 and indicates by deflection of its pointer or otherwise whether there is a voltage difference between those points. The bridge is said to be "balanced" when there is no voltage difference across M.

The well-known relation stating the condition of balance of a Wheatstone's bridge such as that in Fig. 2 in terms of the values of its four resistances may be written:

$$\frac{a}{b}=\frac{c}{d} \qquad (2)$$

The present invention utilizes an electrical network of the general type of that in Fig. 2 and its dependence upon Equation 2, for solving the optical problem represented in Equation 1. This is accomplished, according to a preferred form of the invention, by making the resistances in two opposite arms of the network, say $b$ and $c$, proportional to the focal length $f$ of the camera lens; making another resistance, say $a$, of the network proportional to the distance $v-f$, defined above; and making the fourth resistance $d$ proportional to the distance $u-f$. The factor of proportionality need not be the same for all four resistances, but certain relations between the factors must be observed. For example, numerator and denominator of the left-hand side of Equation 1 can be multiplied by the arbitrary numerical factor $m$, and also both sides of the equation can be divided by another arbitrary factor $n$ without affecting the equality. This gives:

$$\frac{m(v-f)}{mnf}=\frac{f}{n(u-f)} \qquad (3)$$

When cleared of fractions and simplified, Equations 1 and 3 lead to identical equations:

$$(v-f)(u-f)=ff \qquad (1a)$$

Factors such as $m$ and $n$ can be introduced into Equation 1 in any manner which maintains that relation. For the sake of clarity and convenience of description the following discussion is based upon the particular typical arrangement of factors in Equation 3. However, the relationships to be described are not dependent upon any particular form of Equation 3. If now $q$ denotes the uniform factor of proportionality between the resistances of Equation 2, expressed in ohms, and the corresponding optical distances in Equation 3 expressed, say, in inches, the values of the four resistances are:

$$a = qm(v-f) \quad (4a)$$
$$b = qmnf \quad (4b)$$
$$c = qf \quad (4c)$$
$$d = qn(u-f) \quad (4d)$$

(4)

The constants $q$, $m$ and $n$ in practice are assigned values which will lead to convenient and effective values of the various resistances for the anticipated ranges of the optical quantities $f$, $u$ and $v$. For example, under typical conditions in motion picture photography, $f$ is considerably larger than $v-f$, and is considerably smaller than $u-f$. The values of the four resistances are more nearly uniform under such conditions if $m$ is considerably larger than unity and $n$ is considerably smaller than unity, the product $mn$ being close to or equal to unity. The value of $q$, which may be typically of the order of 100 ohms per inch, determines the general scale of all the resistances.

Although resistances $b$ and $c$ appear in Equation 2 their values are ordinarily constant for any given focusing run, or film sequence. Therefore the condition of balance of the bridge can be considered broadly as providing a comparison of the resistances $a$ and $d$, and hence of the corresponding optical quantities $v-f$ and $u-f$. More particularly, this comparison determines whether or not the required relationship (1a) exists between those optical quantities. The electrical means connected between points 14 and 16 of the network reacts selectively to the presence or absence of that relationship, either through the indication of meter M, or by actuating control means tending to establish the desired relationship (see below).

Alternatively, the bridge network can be considered as establishing at point 14 a voltage which corresponds to the relative values of resistances $c$ and $a$; and at point 16 a voltage which corresponds similarly to the relative values of resistances $d$ and $b$. Those voltages are then directly compared, and are equal when the bridge is in balance.

Preferred means for adjusting the rheostat contacts in such a way as to satisfy Equation 4 will now be outlined briefly, and will be described in detail later. It may be noted in general that the resistance $a$ constitutes primarily a measure of the focal adjustment of the lens, while resistance $d$ similarly constitutes a measure of the distance of the object from the camera; resistance $c$ is directly related to the lens focal length $f$, while resistance $b$ is also related to $f$, but with a certain flexibility due to the factors $m$ and $n$. This permits $b$ to be used in practice as a balancing resistor for initially bringing the electrical bridge into balance.

The rheostat C is readily adjusted manually in accordance with the lens focal length $f$ so that its effective resistance $c$ is $qf$ ohms. For convenience in making this adjustment, the rheostat is preferably calibrated directly in terms of focal length as indicated at 58 in Fig. 5. This calibration depends upon the value chosen for $q$, or, considered from a different point of view, the calibration of rheostat C determines the value of $q$. In any case, $q$ can be considered to be fixed once rheostat C is thus calibrated.

Rheostat A is linked mechanically or otherwise to the lens focusing mechanism of the camera in such a way that its effective resistance $a$ is proportional to the displacement $v-f$ of the lens from its position when focused at infinity. The overall factor of proportionality between resistance $a$ and the lens displacement $v-f$, expressed as $qm$ in Equation 4a, depends upon factors such as the mechanical and electrical details of the apparatus. The latter can be constructed or adjusted to give a desired value of $qm$, which is to say (since $q$ is already determined as described above), to give a desired value of $m$. If one or more of the factors mentioned is unknown or arbitrary, the value of $m$ can be considered to be defined by them. Thus, for example, when one lens is replaced by another with a different focusing thread, it may be useful to adopt a new and corresponding value of the factor of proportionality $m$. As will become clear presently, it is not necessary that the value of $m$ associated with a given lens be known, but $m$ always has a definite value, defined through Equation 4a and the particular equipment used.

Resistance $d$ in the present illustrative embodiment is determined jointly by the settings of rheostats $D_1$ and $D_2$, and must satisfy Equation 4d. This is preferably accomplished by linking contact 24 of rheostat $D_1$, say, to some distance responsive device which then controls the position of the contact in accordance with the varying object distance $u$ between the camera lens and the object to be photographed. The linkage is so constructed and adjusted that the sum of the effective resistance $d_1$ of rheostat $D_1$ and the total resistance of rheostat $D_2$ is directly proportional to the object distance $u$, or $$d_1 = qnu - D_2 \quad (5)$$

The factor of proportionality $qn$ is determined by structural details of the equipment, including rheostat $D_1$, the distance responsive device and the linkage between them, and is equal to the ratio of an increment in the resistance $d_1$ to the corresponding increment of object distance $u$. The equipment can be designed to give a selected value of $qn$ (that is, a selected value of $n$), or the mechanism can be selected or varied in accordance with other considerations, each such mechanism leading to some definite value of $n$. With given equipment, and hence a definite $qn$, Equation 5 is satisfied by so connecting the linkage between rheostat $D_1$ and the distance responsive device that, for example, resistance $d_1$ is zero when the object distance $u$ is equal to $D_2/qn$. With the linkage correctly connected, relation (5) is then continuously maintained as $u$ varies.

Contact 25 of rheostat $D_2$ is set in advance, for example manually, so that the portion of the winding of $D_2$ which is shorted out is equal to $qnf$, where $q$ and $n$ are the same quantities discussed above. Such setting of $D_2$ is facilitated by calibrating the rheostat directly in terms of the lens focal length $f$, such calibration taking account of the predetermined values of $q$ and $n$. The effective resistance of rheostat $D_2$ is then $$d_2 = D_2 - qnf \quad (6)$$

Adding Equations 5 and 6, the combined effective resistance of $D_1$ and $D_2$ is $$d = d_1 + d_2 = qn(u-f)$$

in agreement with Equation 4d.

The balancing rheostat B, is to be adjusted so that its effective resistance is $b = qmnf$. The factors $q$, $m$ and $n$ all have definite values, determined as already explained. If these values are known, rheostat B can be adjusted in much the same way that C was adjusted, for example with the help of a scale or set of scales calibrated in terms of $f$ and possibly also in terms of $q$, $m$ and $n$.

However, rheostat B is preferably adjusted by first setting $u$ and $v$ to any pair of values for which the lens is known to be in focus, and then adjusting rheostat B until the electrical bridge is balanced. For making this adjustment, for example, the camera is moved until it is at some convenient object distance $u$ from some convenient object, thus automatically bringing resistance $d$ to the value $qn(u-f)$; and the camera lens is adjusted to the image distance $v$ which brings the selected object into sharp focus, thus automatically setting rheostat A to the corresponding resistance value $qm(v-f)$. In doing this, correct focus may be verified by any of the conventional methods, such as observation of the image on a ground glass, reading the focusing scale on the lens barrel, etc. With the resistances $c$ and $d$ thus set to a pair of values which corresponds to a pair of conjugate foci, rheostat B is then adjusted until the bridge is balanced, indicated by a reading of zero on meter M. Under these conditions optical Equation 2 and electrical Equation 3 are both satisfied, as are also Equations 4a, 4c and 4d. This can be true only if 4b is also satisfied. Thus resistance $b$ must have the value $qmnf$, and this adjustment is made without needing to know the value of the proportionality factor $qmn$, and in particular without needing to know the value of $m$. As pointed out above, this is particularly advantageous when lenses are changed.

The result of the operations just described is that the four resistances $a$, $b$, $c$ and $d$ are now related to the corresponding optical quantities in the way set forth in Equations 4, the camera is correctly focused for some particular object distance $u$, and the bridge is balanced. If now the object distance $u$ is changed in any arbitrary manner, contact 24 of rheostat $D_1$, linked to $u$ by some distance measuring device, changes accordingly, throwing the bridge out of balance. In the modification of Fig. 2, this will be indicated by a departure of the needle of meter M in one direction or the other from its zero position. In order to refocus the camera, rheostat A and the focusing ring of the camera lens to which it is linked are adjusted until the bridge is again in balance, signified by a zero reading on the meter M. The lens will then have been automatically moved the correct distance to re-focus the camera for the new object distance, bringing the object again into sharp focus. Thus correct focus can be maintained during arbitrary changes in the object distance $u$ merely by so adjusting the lens that the meter reading remains zero. The range over which such adjustment can be made is limited only by optical considerations and design of the equipment.

It will be noted that the resistance shorted out by contact 25 of rheostat $D_2$ is $qnf$, while the effective resistance of rheostat C, being the resistance not shorted out by its contact 23, is $qf$. Therefore, the motions of the two contacts 23 and 25 as they are adjusted along their respective windings for different values of focal length are proportional. If rheostats C and $D_2$ are linear rotary rheostats having the same resistance per unit angle, and if the proportionality factor $n$ is given the value unity, the two contact arms will turn through equal angles, and can conveniently be mounted on a common shaft or otherwise connected to be adjusted in unison. Even if the rheostat windings have different constants, or if $n$ is not unity, the two rheostat arms 23 and 25 on their respective shafts can be linked together to turn at a suitable chosen speed ratio, and they can then still be adjusted in unison by a single operation and by reference to a single scale. Although in theory $n$ may have any value, the advantages of requiring only one operation to set contacts 23 and 25 are sufficient so that in practice it is preferable to limit $n$ to some definite value for any one set of apparatus. The linkage between the contact arms 23 and 25 can then be constructed accordingly, as just described. Due to certain further advantages to be described, $n$ is preferably made equal to unity, provided this does not lead to values of the various resistances which differ too widely (see above).

In the special case that the proportionality factor $n$ is unity, the rheostat $D_2$ (or its equivalent) can advantageously be eliminated by a change in the wiring of the bridge circuit, such as that illustrated in Fig. 3. Rheostat D with movable contact 24a in Fig. 3 corresponds to rheostat $D_1$ with contact 24 in Fig. 2, and is controlled in the same general manner by a distance measuring device responsive to the object distance $u$.

Line 19 from voltage source 17 is connected directly to movable contact 23 of rheostat C, instead of to point 15 of the network as in Fig. 2. Thus contact 23 of rheostat C becomes a terminal point of the bridge network. This does not affect the resistance arm $c=qf$ of the bridge, but the resistance arm $d$ of the bridge is now composed of the resistances $d_1+c_1$, the sum of the effective resistance $d_1$ of rheostat D plus that part of rheostat C, denoted by $c_1$, which is not included in $c$. With this arrangement the linkage between contact 24a of rheostat D and the distance measuring device relating it to the object distance $u$ is so connected that $qu$ is equal to $d_1$ plus the fixed total resistance $c+c_1$ of rheostat C. That is, $$d_1+c+c_1=qu \qquad (7)$$

Since $c=qf$, this gives the desired value for the resistance $d$ of the bridge, $$d=d_1+c_1=q(u-f) \qquad (8)$$

This modification has the advantage that when the lens focal length is changed, the adjustment of the single contact 23 sets resistance $c$ and also sets resistance $d$ insofar as the latter depends upon focal length. This avoids the necessity of initially establishing and maintaining correct correlation between the two contacts of two different rheostats, such as 23 and 25 of Fig. 2. Movable contact 24a of rheostat D (Fig. 3) can readily be calibrated directly in terms of the object distance $u$ in accordance with Equation 7, thus facilitating the checking at any time of the rheostat linkage; and rheostat C can be directly calibrated as already described in terms of lens focal length $f$.

It should be noted that the arrangement of Fig. 3 (like that of Fig. 2) sets a lower limit on the value of object distance $u$ that can conveniently be accommodated by a given set of equipment. This is reached when contact 24a reaches the end 28 of rheostat D, making $d_1=0$. The value of $u$ to which this position corresponds is found from Equation 7 to be the total resistance of rheostat C divided by $q$. This is the largest value of the lens focal length for which rheostat C can be adjusted. Therefore, thet object distance $u$ must be larger than the maximum value of lens focal length which the apparatus can accommodate. In most applications this limitation is not of practical importance, and it is entirely avoided, for example, by use of a circuit similar to that of Fig. 2 but in which rheostats $D_1$ and $D_2$ are replaced by a single rheostat with two independently movable contacts which are electrically connected to opposite ends of the winding. The lower limit of $u$ is then the value of the focal length of the lens which is being used at the time. Since a lens cannot form a real image of an object at a distance less than the lens focal length, such a limitation could be significant only in relation to vertical images. Except for the differences mentioned, operation of the modified system of Fig. 3 is substantially the same as that already described.

Fig. 5 is a schematic perspective of an illustrative mechanical embodiment of the invention, based on the electrical circuit of Fig. 2. The camera is indicated at 60 with its lens 61 mounted in a lens barrel 70, the axial position of which is adjustable by rotation of focusing ring 62. Threads 63 in the lens barrel 70 mesh with internal threads of the focusing ring. A ring gear 64 is fixedly mounted on focusing ring 62 and meshes with gear 65 on the shaft 66 of rotary linear rheostat A. A knob 68 is indicated on rheostat shaft 66 for convenient adjustment of the rheostat or of rheostat and lens together. There is preferably some adjustability in the connection between rheostat and lens, such as a frictional relation between gear 65 and its shaft 66, or a releasable positive connection such as is provided by set screw 69. This facilitates adjustment of the linkage so that zero resistance $a$ of rheostat A corresponds to the infinity focus position of lens 61.

There are several advantages of making impedance $a$ directly proportional to $v-f$, the displacement of the lens from its infinity focus position, rather than to its distance $v$ from the focal plane, represented in camera 60 by the film 67. The distinction between those two relations involves only an additive constant, $f$, so that the value of $a$ may properly be said to vary linearly with $v$ as well as with $v-f$. One advantage is that the mechanism required to give the relation expressed by Equation 4a is relatively simple. For lenses mounted in the conventional way the displacement $v-f$ is proportional to the angle through which the focusing ring 62 on the lens mount is turned from its position for infinity focus, the factor of proportionality depending upon the pitch of the focusing threads 63. Hence, it is not necessary to take account directly of the distance of the lens from the film 67 in camera 60 as would be required in determining the image distance itself; instead, the origin of measurement is the infinity focus position of the lens. This is particularly convenient, because the latter position is ordinarily calibrated directly on the lens mount.

For a device which is focused by moving the image-receiving surface rather than by moving the lens, the above remarks will be seen to apply with little modification. The lens position in general is its optical position relative to the image receiving surface, and in that sense the lens position can be modified by moving that surface as well as by moving the lens. The described linkage between rheostat A and lens ring 62 is a specific illustrative example of broad means for relating the rheostat to the relative position of lens and image receiving surface, regardless of how that position may be varied.

An additional advantage of making the resistance $a$ of lens-connected rheostat A proportional to $v-f$ rather than to $v$ itself is that even a relatively small percentage change in the image distance $v$ corresponds to a relatively large percentage change in $v-f$. This means that, other things being equal, a given small error in focus with the present system will throw the bridge farther out of balance and produce a larger deflection of meter M than would be the case in a similar system which depended upon $v$ rather than $v-f$. The invention thus makes possible more accurate control of the focus with equipment of comparable sensitivity, or gives comparable accuracy of control with equipment which can be less sensitive and hence generally more rugged and reliable. This is particularly true for relatively large values of the object distance $u$, which lead to low values of $v-f$. For example, if in a particular application $u$ is to vary only from infinity down to $10f$, the corresponding vardiation of $v$, which is limited to the range from $f$ to $10f/9$, means a relative variation of only about 10% of its value. The corresponding absolute variation of $v-f$ is of course the same, but since this runs from zero to $f/9$ the relative variation is 100% instead of only 10%. In apparatus designed for such an application, the total resistance of rheostat A can be made to correspond to the distance $f/9$, and the useful range of its variation will then be 100% of its maximum value, instead of 10% as in the other instance.

Variable resistance $D_1$ is shown in Fig. 5 as a potentiometer with its shaft 47 linked to a typical distance responsive device comprising cable 40, one end of which is wound on cylindrical drum 41 and which is held in tension by coil spring 42. A worm is indicated at 45, rigidly mounted on drum shaft 44, and engaging worm gear 46 which is secured to potentiometer shaft 47 in an adjustable manner, as indicated by set screw 48. The entire drum assembly 50, including a mounting frame (not shown) and potentiometer $D_1$, is normally supported in fixed relation to camera 60, or to the camera support, so that it partakes of any motion of the camera toward or away from the object to be photographed. For example, drum assembly 50 may be mounted on the camera dolly 54, as indicated schematically in Fig. 6.

The outer end 39 of wire 40 is extended from the drum in a direction generally parallel to the optical axis of camera 60, and is secured to the object 11 (Fig. 1), or at least is held in such relation to the object that it will partake of any motion of the object toward or away from the camera. For example, in Fig. 6, the object 11 is shown as being mounted on a movable dolly 55 (merely to illustrate a movable object), and wire end 39 is shown as being secured to the dolly. The distance between drum assembly 50 and wire end 39 need not be equal to the object distance $u$ between camera lens 61 and object 11, so long as corresponding variations in those two distances are equal. With cable 40 in position as in Fig. 6, and with dollies 54 and 55 set to give any convenient object distance $u$, determined for example by direct measurement, set screw 48 (Fig. 5) is temporarily released and potentiometer $D_1$ is set to the corresponding resistance $qnu-D_2$ by means of knob 51 on potentiometer shaft 47 and scale 49a or 49b (see below) on the potentiometer. With the set screw again tightened the correct linear relation that has thus been established between the potentiometer resistance and the object distance $u$ is maintained automatically as $u$ varies arbitrarily.

The arrangement just described does not take into account the relatively slight motion of the lens with respect to the camera (measured by the change in $v-f$, for example). Since that is ordinarily a small quantity by comparison with $u-f$, it may properly be neglected in most applications. If it is desired to take account of the lens motion in determining $u-f$, it is only necessary, for example, to mount cable reel assembly 50 in fixed spacial relation to lens 61 itself, rather than to camera 60 as in Fig. 6.

Although all four arms of the bridge network are preferably variable, only the two impedances A and $D_1$ (or D in Fig. 3) must satisfy any particular requirement as to linearity with respect to the position of their variable elements. The impedances C and $D_2$, which are adjusted with relation to the lens focal length, can be of a non-linear type, and are then adjusted by reference to suitably calibrated scales. With the preferred mode of operation described above, by which impedance B is adjusted to balance the bridge, the characteristic of that impedance is arbitrary.

If the object 11 is fixed, so that changes in $u$ are due entirely to motion of the camera, it is sometimes convenient to extend the free end 39 of wire 40 in the direction opposite to, instead of toward, the object 11, for example to avoid interference between the wire and the scene being photographed. A given change in the object distance $u$ then results in a rotation of drum 41 through the same angle as before, but in the opposite direction. The resulting change in the resistance of potentiometer $D_1$ can be made to have the correct sign under such conditions by introducing a reversing gear of any suitable type between the two shafts 44 and 47.

However, the effect of such a reversal is preferably accomplished electrically, by making use of that part of the potentiometer winding on the opposite side of movable contact 24 (or of contact 24a if the circuit is like that of Fig. 3). The movable contact is connected to the arm 34 of a double throw switch 37, as in Figs. 2, 3 and 5. When the switch is in the position shown, at contact 35, the connection is directly to one end 29 of the winding, and the effective resistance $d_1$ of the potentiometer is that portion between contact 24 (or 24a) and the other end 28 of the winding. When switch arm 34 is shifted to contact 36, movable contact 24 (24a) is directly connected to the end 28 of the potentiometer winding, and the effective resistance $d_1$ of the potentiometer is determined by that portion of the winding between contact 24 (24a) and end 29. Thus, whichever direction wire 40 is extended from the camera, resistance $d_1$ can be made to increase with increasing object distance by throwing switch 37 to the appropriate position, the latter depending upon the particular mechanism employed.

Corresponding to the two positions of switch 37 in Fig. 5, two scales 49a and 49b are preferably provided on potentiometer $D_1$, both calibrated directly in terms of the object distance $u$, but reading in opposite directions. The zero points of the two scales are located with relation to their respective ends of the potentiometer winding, as described above, so that when contact 24 is at that end of the winding giving zero resistance the scale reading is not zero, but is $D_2/qn$, the distance which corresponds to the total resistance of rheostat $D_2$. Angular increments between corresponding divisions on the two scales are equal (although measured in opposite directions) and depend upon such mechanical factors as the ratio of gears 45, 46 and the diameter of drum 41.

The distance responsive device just described is a typical example of the many forms of mechanical, optical, or electrical range finding devices which can be used to control resistance $d$, automatically; or in accordance with which resistance $d$ can be adjusted manually to maintain the linear relation defined in Equation $4d$ between the object distance $u$ and the electrical impedance $d$. A second example, illustrated schematically in Fig. 6, is suitable for situations in which variations in the object distance $u$ are caused only by motion of the camera dolly over the ground. That motion can then be used to operate rheostat D (or $D_1$), by linking the rheostat shaft, or (as shown in Fig. 6) the shaft of drum 50, to a wheel 53 of the camera dolly, as by a belt 53a. When cable 40 is used to control drum 50, belt 53a is temporarily disconnected in any convenient manner.

Similarly, if only the object 11 is to move, rheostat D can be located with, or in any suitable spaced relation to, the object, and be operated by means responsive to motion of the object relative to the ground, long flexible electrical connections being provided if necessary between that rheostat and the remainder of the circuit. The resistance of such leads may be negligible, but can be taken into account if desired in calibrating the scale or scales of rheostat D. For example, a cable reel 50a can be fixed relative to the ground with cable end 39a secured to object dolly 55, as indicated in Fig. 6. With the arrangement shown, switch 37 is set at contact 36, since a shorter cable then corresponds to a longer object distance.

A further illustrative modification involves the use of two separate rheostats, responsive respectively to motion of the camera and of the object relative, say, to the ground, those two rheostats being connected in series and replacing the single rheostat $D_1$ of Figs. 2 and 3 or D of Fig. 3. For example, one rheostat can be driven from camera dolly wheel 53, as by belt 53a, and the other can be operated by such a mechanism as cable reel 50a in Fig. 6.

The focal length potentiometer is indicated at C in Fig. 5, with an adjusting knob 57 and with a scale 58 calibrated directly in terms of lens focal length in accordance with Equation $4c$.

Rheostat $D_2$ is shown in Fig. 5 connected electrically in series with potentiometer $D_1$ and connected mechanically, as by pulleys and belt 59, to the shaft of potentiometer C. Because of this linkage between potentiometers C and $D_2$, no separate adjustment of $D_2$ is required, and no scale or adjusting knob is illustrated. Potentiometers C and $D_2$ are so wired and connected that as the effective resistance of one increases that of the other decreases, the portion of potentiometer $D_2$ which is shorted out being equal to $n$ times the effective resistance $c$ of potentiometer C, as explained above.

The balancing rheostat, indicated at B in Fig. 5, need not carry any calibration if it is to be adjusted as described by balancing the bridge.

In general it is preferable to allow the value of $m$ to vary for lenses of different focal lengths. This results automatically, for example, if rheostat A is linked in a uniform manner to the focusing ring 62 of each lens, but the focusing threads 63 of the various lenses are of different pitch. Rotation of the ring through a given angle then changes the effective resistance $a$ of rheostat A by a uniform amount, but shifts the focal position of the lens by an amount which depends upon the pitch of the threads. For example, if the pitch of the threads of the focusing ring of each lens is proportional to the focal length of the lens, the constant $m$ in Equation 4a is seen to be inversely proportional to the focal length. This has the advantage that a rheostat A of given total resistance will permit a greater lens displacement $v-f$, with a lens of relatively large focal length, and will automatically provide greater sensitivity of control with a lens of relatively small focal length for which larger focal displacement is not required. As has already been pointed out, a shift in the value of $m$ is readily compensated by rebalancing the circuit by means of rheostat B. However, a shift of the particular type just described does not, theoretically, require adjustment of B (see below). Actually, the pitch of the threads on lenses of various focal lengths is not ordinarily exactly proportional to the focal length, and may not even approximate such proportionality. Hence, the use of rheostat B as a balancing rheostat is of great practical importance.

The following set of values for the various constants and resistances is presented as an illustrative example of a system in accordance with the invention as illustrated in Fig. 3, and with particular reference to the preceding discussion. Distances are stated in inches and resistances in ohms.

$$q = 100 \text{ ohms/inch}$$
$$m = 60/(f \text{ in inches})$$
$$n = 1$$
$$A = qm(v-f)_{max} = 500 \text{ ohms}$$
$$B = qmnf_{max} = 6000 \text{ ohms}$$
$$C = qf_{max} = 600 \text{ ohms}$$
$$D = qn(u-f)_{max} = 60,000 \text{ ohms}$$

With the values given above, the maximum usable values of the various optical quantities, as limited by the four resistances, are:

$$(v-f)_{max} = \frac{A}{qm} = \frac{Af}{6000} = f/12$$

$$f_{max} = \frac{B}{qmn} = \frac{Bf}{6000} = f \text{ (i. e., } f_{max} \text{ is not limited by B)}$$

$$f_{max} = \frac{C}{q} = 6''$$

$$(u-f)_{max} = \frac{D}{qn} = \frac{D}{100} = 600'' = 50'$$

The assumed inverse linear dependence of the constant $m$ upon the lens focal length has two primary results. In the first place, the maximum lens displacement available for focusing is proportional to the lens focal length, in spite of the fact that rheostat A has a limited maximum resistance. The specific value of the maximum lens displacement in the present example, $f/12$, corresponds to a minimum object distance $13f$. Thus with specific system described, a 6" lens can be focused on an object at any distance between 78" and 50', while a 2" lens can be focused for any object distance between 26" and 50'. In the second place, the resistance of rheostat B (the balancing resistance) has the same value for all focal lengths, since the change in $m$ just balances the change in $f$. In the example, the effective resistance $b$ of the balancing resistance is 6000 ohms for all focal lengths. Although a fixed resistor of 6000 ohms can be used theoretically for B, it is preferable in practice to provide a rheostat having a total resistance somewhat above 6000 ohms, so that the circuit can be conveniently and accurately balanced as already described.

The constant $n$ may be varied arbitrarily like the constant $m$ (that is, the linkage ratio between rheostat D (or $D_1$) and the object distance $u$ may be variable, like the linkage ratio between rheostat A and lens displacement $v-f$), changes in one or both of $m$ and $n$ being compensated by adjusting balancing rheostat B as already described. However, if $n$ changes, it is theoretically necessary in the circuit of Fig. 2 to reset contact 25 so that the section of rheostat $D_2$ which is shorted by that contact is equal to the new value of $n$ times $qf$; and an equivalent adjustment must be made if a different circuit, such as that of Fig. 3, is used. In practice, at least for the most common range of object distances, $u$ is very considerably greater than $f$; a given error in setting contact 25 (or its equivalent) therefore causes a relatively small error in resistance $d$. For this reason the correction just described may be neglected altogether, or, in the circuit of Fig. 2, it is not difficult in practice to calibrate contact 25 so that it can be adjusted independently of rheostat C with the required accuracy to take account of different values of $n$ as well as of $f$.

In the special case of apparatus to be used only with lenses of some fixed focal length, or with a single lens, rheostats B, C and $D_2$ of Fig. 2, for example, can be replaced by fixed resistors. Or resistance $d$ can then be obtained from a single rheostat $D_1$, say, with a single movable contact 24, rheostat $D_2$ being omitted and the linkage between contact 24, and the means responsive to variations in the object distance $u$ being such that the effective resistance of rheostat $D_1$ is zero when the object distance equals the fixed focal length $f$, and increases linearly (as before) with increasing object distance. In the later instance the linkage ratio between rheostat $D_1$ and object distance $u$, and hence the value of $n$, can be varied arbitrarily (as may be convenient, for example, if various different types of distance responsive means are to be employed), provided only that resistance B (or C) is variable and is used to compensate for changes in $n$ by balancing the bridge in the manner already described in connection with compensation for variations in $m$.

Fig. 4 illustrates alternative circuiting for meter M between points 14 and 16 of Figs. 3 and 5. Meter M in Fig. 4 is not connected directly between network points 14 and 16, but is connected for safety and convenience in parallel with a voltage limiting device indicated at 70. This is illustratively shown as a pair of barrier layer rectifying elements connected in parallel but with opposite polarity. When the potential difference between points 14 and 16 is a small fraction of a volt in either direction such a unit acts as a high resistance and the voltage is therefore indicated by meter M with essentially its normal sensitivity. But as the voltage increases, the effective resistance of the rectifier assembly becomes very low, and the resulting current through it prevents the full voltage from reaching the meter. By proper choice of fixed resistances such as 71, 72 and 73, connected in the meter circuit as shown in Fig. 4, both the initial sensitivity of meter M for small deflections and the full scale sensitivity can be determined as desired within wide limits. Thus very small departures of the bridge circuit from balance and also conditions of extreme unbalance are indicated on the same instrument without danger of damaging it.

Instead of depending upon manual adjustment of focusing ring 62, or of knob 68 on rheostat A, Fig. 5, the follow focus system can be made entirely automatic by providing a power drive for the lens focusing adjustment with suitable electric circuiting to make it responsive to the state of balance of the bridge circuit. An illustrative preferred embodiment of such a control circuit for operating a focus-adjusting motor is shown in Fig. 4. The sensitive polar relay 81 is connected between the points 14 and 16 of the bridge network. In Fig. 4 this connection is made from point 16 by the line 83 and from 14 through resistance 73 and one contact of the double throw switch 80, the other contact of which makes connection to the meter M as in the previously discussed circuit. With this arrangement the system can be switched conveniently from manual to automatic operation merely by throwing switch 80.

The movable arm 84 of relay 81, the normal position of which is intermediate between the two contacts 90 and 91, is connected by line 85 to one side L2 of a suitable source of power, here indicated by the lines L1 and L2. These may be connected to the same source of power which actuates the bridge circuit, indicated by 17 in Fig. 4. Contacts 90 and 91 of relay 81 are connected respectively through the motion limiting microswitches 92 and 93 and the magnet coils of relays 100 and 101 to the other side L1 of the power source. Each of the relays 100 and 101 has a single pole double throw switch. The movable arms of these relay switches are connected by the leads 102 and 103 to the armature of motor 105. The back contacts of the switches are connected together and to one side of the field coil of the motor by lead 106. The other side of the field coil is connected by line 108 to power source L2. The normally open contacts of the switches are connected together and to power source L1 by line 107. Motor 105 is mechanically connected by a linkage indicated at 105a in Fig. 4 to shaft 66 of rheostat A and hence to the focusing adjustment of camera lens 61. Linkage 105a is preferably a gear train, such as that shown schematically in Fig. 5, which includes a clutch or releasable connection as indicated by set screw 104, and which drives through ring gear 64 on the lens mount.

With switch 80 in the position opposite to that shown in Fig. 4, if the bridge circuit becomes unbalanced by some definite small amount, a sufficient current flows through the coil of relay 81 to actuate its switch arm 84 in one direction or the other, closing a circuit through one of contacts 90, 91, and activating the magnet coil of relay 100 or of relay 101. This allows current to flow from line L1 to line L2 through the armature winding of motor 105 in one direction or the other depending on which way switch arm 84 is thrown; and in series through the motor field winding always in the same direction. Thus, the motor is operated in one direction or the other. Its mechanical connection to rheostat A and the detailed circuit connections must of course be such that when the bridge becomes unbalanced in a given sense the resulting operation of the motor turns rheostat A in the correct direction to restore the bridge to a condition of balance. The microswitches 92 and 93 can be mounted in such relation to actuating cams associated with shaft 66 of rheostat A that they act as limit switches and prevent the motor from turning the rheostat too far in either direction.

It will be understood that the electromagnetic relay indicated at 81 can be replaced by various equivalent devices, such for example as an electronic relay, and that other modifications in the particular circuit illustrated can be made without departing from the scope of my invention.

Figs. 7 through 15 show an illustrative preferred embodiment of the physical features of my invention. In this embodiment the rheostat D and the cable and reel mechanism relating it to the object distance $u$ are included in the reel unit 50, shown in Figs. 7 through 12; while a second or control unit 225, shown in Figs. 13 through 15, comprises the remainder of the electrical apparatus, including the focus drive motor when this is used. Mechanical connection between the control unit and the focusing lens mount itself is made by a flexible cable or similar means. The entire apparatus can also be designed as a single unit, or can be divided in other ways into a number of units, as may be desirable for various applications.

The supporting frame of the cable reel unit 50 includes the horizontal base plate 116 and the three vertical plates 117a, 117b and 117c. The upper edges of the two vertical plates 117a and 117b are joined by the cover plate 118, while vertical plates 117b and 117c are rigidly spaced by tie rods 119. A protective cover for the entire unit fits over the periphery of base plate 116, but is not shown in the drawings.

Rheostat D is mounted on subframe 117d as shown in Figs. 8 and 9. Its operating shaft is connected by collar 111 to the vertical shaft 112, which is journalled in subframe 117d and top plate 118. At the upper end of shaft 112 is the rheostat adjusting knob 113 and a large disk 114 which carries two calibrated scales, indicated at 115 and 116 (Fig. 7), which read in opposite directions and correspond to scales 49a and 49b of Fig. 5. One or other of these two scales can be seen through window 120 in the flat horizontal slider 121. This is radially movable with respect to shaft 112 by the handle 122, its motion being guided at one end by the bracket 123, and at the other end by slotted hole 124 which fits over screw 125, both guiding and limiting the motion of the slider.

Slider 121 carries the leaf spring 126 (see Figs. 7 and 9) which acts as a switch blade in conjunction with pairs of electrical contacts 127, 128, mounted in insulating plate 129. In one extreme position of the slider, switch blade 126 connects together the two contacts 127; in the other extreme position, the two contacts 128. The four contacts are connected to form a single pole, double throw switch, which is switch 37 of Fig. 3. Window 120 is an illustrative example of scale selecting means, and automatically selects the appropriate one of the two scales 115 and 116 for each position of the switch, so that the visible scale corresponds to the circuit connections of rheostat D.

In addition to knob 113 for setting rheostat D, a fine adjustment is provided by knob 130, Fig. 9, which can be pressed in, causing its shaft 131 to slide in its bearings in the bracket 132, compressing spring 133 and meshing pinion 134 with bevel gear 135 on shaft 112.

Two distinct means of driving shaft 112 and rheostat D are provided. Any convenient mechanism for connecting these means one at a time to the shaft can be used. The preferred mechanism illustrated, particularly in Fig. 10, makes use of the clutch 140 which is rotationally fixed but axially movable on shaft 112 (or, more exactly, upon spacing bushing 146), as by key 145. This sliding motion is controlled by knob 141 (Fig. 8) which operates eccentric 142. The latter fits freely in groove 143 in clutch 140, causing the latter to slide on its shaft. At the two extremes of its sliding motion clutch 140 engages teeth on one or the other of the bushings 150 or 155. These turn freely on shaft 112, on which they are spaced axially by bushing 146, but they are keyed to collars 151 and 156 respectively and also act as bearings for the gears 152 and 157 respectively. The collars carry the springs 153 and 158 respectively which frictionally engage discs 152a and 157a of suitable material set into the faces of the respective gears. The gears are driven respectively by the worms 154 and 159 on shafts 160 and 162.

The result of this arrangement is that when one of the gear assemblies has been selected and linked to shaft 112 by clutch 140, the associated worm gear drives shaft 112, but only through the frictional contact between it and spring 153 or 158. This contact is sufficiently close to cause a positive drive of rheostat D under normal operating conditions, and yet permit the rheostat to be reset when desired by means of knob 113 or fine adjustment knob 130 without the necessity of disengaging clutch 140. In practice it is convenient if not necessary to make the final rheostat adjustment after the clutch has been connected with the selected driving means.

Worm 154 is fixed on shaft 160, journalled in frame plates 117a, 117b and 117c. This shaft also carries cable reel 161, which performs the same function as reel 41 in Fig. 5. The second worm 159 is fixed on shaft 162 which is journalled in frame plate 117a and bracket 163 on plate 117b (Figs. 8 and 9). Shaft 162 extends beyond plate 117a (Fig. 8) and can conveniently be used when it is desired to drive rheostat D from a wheel of the camera dolly or from an auxiliary caster. Such a drive is indicated schematically in Fig. 6 by the belt drive 53a, from wheel 53.

Cable reel 161 is preferably spirally grooved as indicated fragmentarily at 165 in Fig. 7, and the cable 166 is fed to these grooves from guide hole 170 in cable guide 171. The cable guide is moved parallel to the axis of reel 161 by lead screw 172, its rotation upon the screw being prevented by guide bar 173 (see Figs. 7, 11 and 12). Lead screw 172 is driven from reel shaft 160 by gears 173, 174.

Cable 166 is held in tension by the coil spring indicated at 175 in Fig. 7. The outer end of this spring is made fast to drum 176 which is rigidly mounted on disk 177 as by screws 178 and spacing sleeves 179. Disk 177 is clamped to frame plate 117c by means of bushing 188 and nut 189, its rotational position relative to the plate being adjustably fixed by means of ratchet wheel 190 keyed to bushing 188 and engaged by pawl 191.

The inner end of spring 175 is secured to bushing 180 which rotates freely relative to shaft 160 and also relative to spring housing 176. Bushing 180 carries gear 181 which drives shaft 160 (and cable reel 161) through pinion 182, pinned to it, and gears 183, 184 which are fixed on a bushing 185 turning on one of the spacing sleeves 179. As cable 166 is pulled off reel 161, pinion 182 on the reel shaft turns bushing 180 in the same direction but at a slower rate, winding spring 175. Due to the gearing, a relatively short spring is able to rewind the large number of turns of cable which are required.

The free end of cable 166 preferably carries a formation such as ring 167 which both facilitates securing the cable end in suitable relation to the object, as described above, and prevents it from being withdrawn through cable guide 171. In order to prevent damage to the cable guide mechanism in case of free release of the cable, a brake is provided on the reel shaft which acts automatically to stop the reel when cable 166 is almost completely rewound. Brake band 200 acts on brake drum 201 which is preferably constructed as an integral part of reel 161. As is seen in Fig. 11, brake band 200 is supported by pivots 202, its free ends carrying blocks 200a and 200b which are urged together by coil spring 203 acting through adjusting nut 205 and rod 204. The two blocks 200a and 200b can be separated, preventing braking action, by rotation of cam 210 which, with operating knob 213, is fixed on shaft 211, journaled in bracket 212. Cam 210 is so shaped that when knob 213 is released the cam is normally returned to its horizontal position by action of spring 203, reestablishing the braking action.

However, the braking action can also be prevented by pin 215 which is slidably mounted in a hole in frame plate 117b and extends between the two brake band blocks 200a and 200b. As shown in Fig. 12, the pin is guided by its flange 217 sliding in hole 221 in the plate and by its cylindrical surface 216 sliding within flange 222 of the plate. Coil spring 220, bearing against flanges 217 and 222, urges the pin to the right in Fig. 12. When it is fully extended, as in the figure, both its relatively thin end section 219 and its thicker intermediate section 218 are inserted between the blocks 200a and 200b, holding them apart and preventing braking action. This is the situation when cable 166 is being used normally. However, as the cable is rewound on the reel, cable guide 171 moves to the left, contacting the smaller protruding section 219 of pin 215 and pressing the pin in against the force of spring 220. This removes the thicker section 218 of the pin from between the end blocks of the brake band, which are therefore pressed closer together by spring 203, initiating braking action. This will be maintained, subject of course to manual operation of cam 210, as long as cable guide 171 remains close to the brake band. If a few feet of the cable are withdrawn from the reel, moving cable guide 171 out of contact with the pin, the latter is still held in its retracted position by contact of its shoulder 218a with the face of the brake band blocks. However, as soon as the latter are momentarily separated by rotation of cam 210, pin 215 returns to the position shown in Fig. 12 and prevents action of the brake until cable 166 is again almost completely rewound. This manner of controlling the brake is found in practice to give the required protective control of the cable reel without appreciably complicating operation of the cable.

In the control unit 225 of the present preferred embodiment of my invention, shown in Figs. 13 through 15, most of the parts are mounted on the front panel 230 of a rectangular case which includes also the back panel 231 and the sides 232 of one-piece construction. The microammeter 235, mounted in the lower left hand section of front panel 230, corresponds to meter M of Figs. 2, 3, 4 and 5, and indicates the condition of balance of the electrical bridge network. Rheostat B is indicated behind the upper left section of panel 230, and is preferably adjusted by the screw slot 239 in the end of its shaft, although a conventional knob can be provided instead. Near the upper right corner of panel 230 is mounted rheostat C. This is adjusted by control knob 243 in accordance with scale 244, calibrated directly in terms of lens focal length. Electrical connection between the control unit and rheostat D of the reel unit 50 described above is made by a cable, not shown, which plugs into the socket 245 on the side of the control unit.

Rheostat A is mounted on subframe 251 on the back of panel 230. The rheostat shaft is directly coupled to shaft 252, journalled in the vertical plates of this subframe. Shaft 252 is driven through gear 255 from pinion 256 on the parallel shaft 257. Gear 255 is linked to shaft 252 only through the frictional contact of springs 261 which are mounted on collar 260, pinned to the shaft. This frictional contact is sufficiently strong to provide positive drive under normal conditions between shafts 257 and 252, but permits shaft 252 and rheostat A to be adjusted independently of shaft 257, as by the screw slot 253 at its forward end and accessible from the front of the panel. Driving shaft 257 carries hand wheel 258 at its forward end; its rear end extends through back panel 231 and is mechanically linked, for example by means of the flexible cable indicated at 259, to the focusing ring on the lens mount of the camera (see the schematic showing in Fig. 5).

If, as is ordinarily the case, the camera has a focusing shaft which is normaly linked by gearing or the like to the lens focusing ring, flexible cable 259 can conveniently be coupled directly to that focusing shaft. In completing such a mechanical connection to the camera no account needs to be taken of the relative rotational positions of rheostat A and the lens focusing ring, since the friction clutch at gear 255 permits this adjustment to be made later. It is only necessary, after the connection is complete, to set the lens mount to its infinity focus position and then, with shaft 257 stationary, to adjust rheostat A to zero resistance by means of screw slot 253. Rotation of hand wheel 258 then controls both the resistance of rheostat A and the focal setting of the lens in the required manner.

The control unit illustrated includes also the equipment necessary to keep the electrical bridge in balance by automatic instead of manual operation of shaft 257. This equipment is based upon the electric circuit already discussed in connection with Fig. 4. The sensitive polarized relay indicated schematically at 81 in that figure is shown at 260 in Figs. 13 and 14; relays 100 and 101 of Fig. 5 are shown at 261 and 262 in Figs. 13 and 14; and the reversible drive motor shown schematically at 105 in Fig. 5 is motor 265 of Figs. 14 and 15. Motor 265 is removably mounted on panel 230 by means of plate 264 and three long thumb screws 266 and spacers 267, the screws entering threaded holes 266a in the panel. Motor 265 drives shaft 257 through a built-in worm reduction gear 268 and gears 269, 270, acting through standard camera coupling 271. Electrical connection to the motor is made by a cable, not shown, which plugs into socket 263 on the side of the case.

The switch indicated at 80 in Fig. 4, by which the bridge circuit is connected alternatively to meter M or to the motor control circuit, is shown at 271 and its control knob at 272 in Figs. 13 and 14. Provision is made at 274 for mounting on subframe 251 the various fixed resistances and other small elements required in the circuit, such as resistances 71, 72, 73 and 75 and rectifier unit 70 of Fig. 4.

The limit switches 92 and 93 of Fig. 4 are shown in Figs. 13 and 14 at 275 and 276. They are mounted on subframe 251 and are operated respectively by cams 277 and 278, rigidly mounted on shaft 252 of rheostat A. The azimuths of these cams on the shaft are so adjusted that the relay circuit by which the motor is being driven is automatically opened at either extreme of the motion of rheostat A. The frictional connection through spring 261 prevents damage to the rheostat, quite apart from the limit switches, but the latter serve the important function of preventing the adjustment of rheostat A with relation to the lens focus position from being accidentally disturbed by slipping of the friction connection.

I claim:

1. In a system for focusing a focusable lens with respect to an object, the combination of, two variable electrical impedances, means linking one of the said impedances to the lens and acting to vary that impedance substantially directly proportionally to the displacement of the lens from its infinity focus position, the associated factor of proportionality having a predetermined value, means acting to vary the other said impedance substantially directly proportionally to the distance between the object and the outer principal focus of the lens, the associated proportionality factor having a predetermined value, electrical circuit means connected to the two impedances and responsive selectively to deviations of their product from a value which is proportional to the square of the focal length of the lens with an associated factor of proportionality equal to the product of the two first mentioned factors of proportionality, the said electrical circuit means comprising a bridge circuit having the said impedances connected respectively in two opposite arms of the bridge, and means acting under control of the said circuit means to vary the condition of focus of the lens in a direction to reduce the magnitude of the said deviations.

2. The combination defined in claim 1 and in which the second mentioned means includes physical means responsive to variations in the lens-to-object distance so as to physically represent that distance, means linking the second mentioned impedance with the said distance responsive means and acting to vary that impedance linearly with the said distance, and means for adjustably rendering ineffective a portion of the so varied impedance, which is proportionate, at the second mentioned proportionality factor, to the focal length of the lens.

3. Focus control mechanism for a system which includes means defining the location of an image receiving plane, a lens having an optical axis, an inner principal focus and an outer principal focus, means for supporting the lens in spaced relation on its optical axis to the said plane, focusing means for adjustably varying the axial distance between the inner principal focus of the supported lens and the image receiving plane, and means defining the position of an object; said focus control mechanism comprising, two variable impedances, means operatively interconnecting one of the impedances with the said focusing means to vary the impedance in response to variations in the focusing means and acting to maintain that impedance equal to the product of a first predetermined proportionality constant and the axial distance between the inner principal focus of the lens and the image receiving plane, means operatively connected to the other impedance and acting to maintain that impedance equal to the product of a second predetermined proportionality constant and the axial distance between the object and the outer principal focus of the lens, electrical circuit means connected to the said impedances and selectively responsive to deviations of their product from the product of the square of the lens focal length and the two said proportionality constants, the said electrical circuit means comprising a bridge circuit having the said impedances connected respectively in two opposite arms of the bridge, and means acting under control of the said circuit means to actuate the said focusing means in a direction to reduce the magnitude of the said deviations.

4. In a system for focusing a lens which is axially movable with relation to a focal plane to focus the image of an external object on that plane; the combination of an electrical bridge circuit of four adjustably variable impedances, one of those impedances, comprising one arm of the bridge, being composed of two independently variable sub-impedances, means for adjusting one of the sub-impedances to an impedance value equal to the difference between a predetermined constant and a quantity proportional to the focal length of the lens, physical means responsive to the distance between the object and the lens so as to physically represent that distance and acting to set the other sub-impedance to an impedance value equal to the difference between a quantity proportional to the object-lens distance and the said constant, whereby the total impedance value of the two sub-impedances is proportional to the difference between the object-lens distance and the focal length of the lens, physical means actuated by focussing movements of the lens and acting to vary another of the said impedances, which constitutes the arm of the bridge opposite the first mentioned arm, to maintain said other impedance directly proportional to the distance between the said focal plane and the interior principal focus of the lens, means for adjusting the other two said impedances, which are the other two arms of the bridge, to impedance values which are proportional to the focal length of the lens, circuit means selectively responsive to the condition of balance of the bridge, and means for axially moving the lens with relation to the focal plane, and thereby varying the second mentioned impedance, to balance the bridge.

5. A system as defined in claim 4, and in which the second mentioned sub-impedance and one of the two last mentioned impedances comprise portions of a unitary impedance element, which portions lie on opposite sides of a movable divider contact which forms one terminal of the bridge, the total impedance value of the impedance element being equal to the said constant.

6. Focus control mechanism for an optical system of the type that includes means defining the position of an image plane, means defining the position of an object plane, a lens having an optical axis, an inner principal focus and an outer principal focus, and means for supporting the lens in spaced optical relation on its axis between the said planes, said focus control mechanism comprising, two variable impedances, means operatively connected to one impedance and acting to maintain that impedance equal to the product of a first predetermined proportionality constant and the axial distance between the image plane and the inner principal focus of the lens, means operatively connected to the other impedance and acting to maintain that impedance equal to the product of a second predetermined proportionality constant and the axial distance between the object plane and the outer principal focus of the lens, electrical circuit means connected to the said impedances and selectively responsive to deviations of their product from the product of the square of the lens focal length and the two said proportionality constants, the said electrical circuit means comprising a bridge circuit having the said impedances connected respectively in two opposite arms of the bridge, and focusing means for adjustably varying the axial distance between one of the said planes and the corresponding principal focus of the lens, whereby the value of the corresponding impedance is correspondingly varied, the said focusing means being actuable in accordance with the condition of the said circuit means to reduce the said deviations.

HAROLD C. SILENT.

REFERENCES CITED

The following references are of record in the file of this patent:

UNITED STATES PATENTS

| Number | Name | Date |
|---|---|---|
| 502,399 | Haskins | Aug. 1, 1893 |
| 1,244,254 | Steadman | Oct. 23, 1917 |
| 1,271,929 | Nelson | July 9, 1918 |
| 1,800,328 | Sundhaussen | Apr. 14, 1931 |
| 1,816,290 | Klimis | July 28, 1931 |
| 2,134,757 | Goldsmith | Nov. 1, 1938 |
| 2,410,651 | Glass | Nov. 5, 1946 |

FOREIGN PATENTS

| Number | Country | Date |
|---|---|---|
| 669,353 | Germany | Dec. 24, 1938 |

OTHER REFERENCES

Society of Motion Picture Engineers Journal (article by Silent), vols. 48, 49 #2 pages 130–139, 1947. (Copy in Div. 7.)